US United States Patent [19]
Hawley et al.

[11] 3,642,490
[45] Feb. 15, 1972

[54] METHOD OF TREATING VEGETABLE PROTEIN

[72] Inventors: Robert L. Hawley, Webster Groves; Christopher W. Frederiksen, St. Louis; Ralph A. Hoer, Ballivin, all of Mo.

[73] Assignee: Ralston Purina Company, St. Louis, Mo.

[22] Filed: Mar. 27, 1967

[21] Appl. No.: 625,980

[52] U.S. Cl. ............................................99/17, 260/123.5
[51] Int. Cl. ........................................................A23j 1/14
[58] Field of Search ......................99/98, 17, 64; 260/123.5

[56] References Cited

UNITED STATES PATENTS

| | | | |
|---|---|---|---|
| 2,881,159 | 4/1959 | Circle et al. | 260/123.5 |
| 3,001,875 | 9/1961 | Sair | 99/17 |
| 3,303,182 | 2/1967 | Sakai et al. | 290/123.5 |

OTHER PUBLICATIONS

John V. Ziemba, Let Soy Protein Work Wonders For You. Food Engineering, May 1966, Vol. 38, No. 5, pp. 82-84, 87-90, 93.

*Primary Examiner*—A. Louis Monacell
*Assistant Examiner*—William A. Simons
*Attorney*—Price, Heneveld, Huizenga & Cooper

[57] ABSTRACT

The preparation of a bland flavored, vegetable protein food product, preferably a soy protein food product, having excellent and controlled water dispersibility, by forming a slurry of the protein in water, preferably after separating the carbohydrates, sugars, and other nonproteins from the material, heating the slurried material practically instantaneously to elevated temperatures and severely physically working it, preferably by ejecting the slurry material from a nozzle while injecting steam into it, retaining the slurried material at elevated temperatures and under an elevated positive pressure for a brief, controlled time interval, and then suddenly releasing the pressure, volatilizing some moisture along with entrained, objectionable flavor and odor substances, and thereby causing partial cooling, removing the volatilized products and leaving a slurry of sterilized, bland flavored, highly water dispersible protein material, and then preferably drying the slurry to a bland tasting powder which is highly redispersible.

14 Claims, No Drawings

METHOD OF TREATING VEGETABLE PROTEIN

BACKGROUND

This invention relates to food, the the preparation of vegetable protein food products of controlled, high dispersibility, and more particularly to a method of preparing a completely bland flavored, vegetable protein food and a bland flavored soy protein food of high dispersibility, and food products made therefrom.

This invention was conceived and developed largely for soy materials because of the special problems encountered with such materials. Therefore, it will be explained largely with respect to soy materials, and has special application to such materials, although it can be used for other vegetable protein materials in the broader aspects of the invention.

The preparation of vegetable protein products by a variety of processes is known, including that of soy protein products, usually from isolated soy protein obtained from oil extracted soy meal. If such products from soy materials are prepared for human or animal consumption, they are normally designated "edible" soy protein. The product is high in protein content and has a substantial food potential.

However, as is known to those skilled in the processing of soy material, and to purchasers and potential purchasers, this product retains a definite undesirable odor and flavor characteristic of all soy products. The flavor characteristic is commonly referred to as bitter or beany. Just what causes this flavor is not known, but it is believed to be due to trace materials tenaciously retained by or in the molecular protein structure. These proteins, of varying types, have complex molecular structures of twisted or helical configuration, and are sometimes referred to as protein bundles. Tremendous efforts have been exerted by many persons in the past few decades in efforts to eliminate this extremely troublesome flavor and odor problem, because it presents a substantial block to widespread adoption of the product as a food. Several techniques suggested do improve the product by reducing these undesirable characteristics somewhat. These techniques include the addition of special reagents such as acetic, hydrochloric, sulfuric, phosphoric, and sulfurous acids, dilute ammonia, carbon dioxide, ethylene, steam diluted with carbon dioxide and nitrogen, and others. They include extraction of oil from the soybean meal flakes with ethanol, treatment with certain enzymes, batch autoclaving or open kettle boiling of the materials for long periods of time, with or without agitation. Such treatments are derived using empirical methods because very little is really known about the structural makeup, and especially the behavior of such materials upon being subjected to various treatments. Such heating treatments involve substantial difficulties because of the fact that when the material is heated above about 160° F., gelatin occurs which seriously limits the usefulness of the product, because the product is extremely tough and rubbery, so as to be hardly edible, and is largely insoluble in water. This resulting product can only be changed by heating it for several hours to actually breakdown the molecular structure. This is undesirable from a processing viewpoint, and because of resulting limitations of the product usefulness. In fact, heating of these vegetable proteins as by autoclaving, particularly soy proteins, normally results in almost inedible products.

Even when these relatively complex and costly techniques are employed, some of the bitter or beany flavor and odor characteristics remain, even though developers of such techniques have proclaimed their products as "bland." This retention of part of the undesirable flavor has in fact prevented the currently produced products from being acceptable by purchasers except where the flavor can be heavily masked by other flavorings, or can be placed in products of those unable to complain, such as babies. Present soy protein products certainly cannot be substituted for completely bland products such as milk, for example, without being subject to instant detection. This limitation is very significant and very real.

Further, heat treatment of these vegetable proteins normally drastically reduces the functional properties thereof. More specifically, although the aqueous dispersibility (capacity to partially form a colloidal suspension and to partially dissolve in an aqueous fluid) of nonheat treated vegetable proteins is usually relatively high, e.g., about 87 percent, plus or minus, after heat treatment the dispersibility of such materials frequently drops to a low dispersibility of about 20 percent or so. Hence, the material will not nicely suspend and dissolve in water to form a milk-type product for example. To be functional the product should have a high dispersibility of at least more than 50 percent and usually more than 75 percent. Yet the higher the dispersibility, the more pronounced is the undesirable flavor, since flavor cannot be detected well when dispersibility is low. Therefore, the potential processor has the dilemma of trying to improve functionality by maintaining high dispersibility while trying to lessen the bitter flavor and odor characteristics which become more noticeable with increase in dispersibility.

SUMMARY OF THE INVENTION

The major object of this invention is to provide a method of processing vegetable protein and particularly soybean protein materials to form a completely bland, highly desirable, edible protein product that is free of the so-called bitter or beany flavor and odor characteristics, to such an extent that the product can even be freely substituted for completely bland products such as milk, and that has high dispersibility to be functional. Another object is to obtain such a product which is also highly functional due to a controlled high dispersibility, that enables excellent grade aqueous suspensions to be formed. Hence, a resulting milk product is smooth, not chalky or lumpy or granular, as well as pleasant tasting. Yet the novel method neither requires or employs any special additives or expensive lengthy processing and can be practiced without necessarily resulting in a gel product. The method can even be practiced in a fashion to give a vegetable protein product of no gelation, as is normally desired, or one of a controlled degree of gelation, as desired. The resulting product needs no flavor masking, but rather can be used directly as a food, and also will blend smoothly with products containing other flavorings without altering the character of the other flavorings.

Moreover, the novel soy treating process can be operated on an automated continuous flow basis, with a minimum of operating personnel, and with a high production output rate.

The basic unique product obtained is one of excellent taste characteristics and excellent functionality. It is highly dispersible from a dry state. Yet, it is treated with a process involving heat and elevated temperatures. The product uniquely has an optimum combination of properties not obtainable heretofore, in having a high dispersibility, e.g., of about 86 percent or so as desired, with resulting high functionality, and also having the excellent flavor free of the characteristic soy flavor. Hence, it can be used as a food product in various forms, with high protein content. It also can be selectively added to a wide variety of other food products to effect special results, adding controlled protein content without objectionable flavor results.

The novel process preferably treats the soy material as an aqueous slurry with controlled, rapid, dynamic heating to an elevated temperature range and with momentary physical working under dynamic conditions and under controlled positive pressure and elevated temperature conditions to expose and loosen the tenacious hold of the obnoxious substances by the complex protein molecules. The so-treated slurry is retained for a brief controlled retention period at elevated temperature and under positive pressure. Then the released obnoxious substances are removed by causing subsequent instant pressure release to cause flash off, with vaporizing of some moisture that is laden with the entrained odiferous obnoxious substances, followed by separation of the vaporized materials from the slurry. The slurry is then dried to an attractive redispersible white powder. The product does not form a gel unless the range of solids, treating temperatures, and holding times are regulated to form a product of controlled degree of gelatin. The full nature and significance of the process and product will be understood upon studying the detailed description to follow.

As is well known, the interrelated chemical and physical characteristics of natural food substances are so extremely complex that very little is truly known or understood about them. Research into the behavior and nature of these characteristics and the changes caused in them under differing conditions and treatments is dependent almost entirely upon an empirical approach. Further, the acceptance of such materials by humans or animals, and the degree of usefulness of such by the human system or by animal systems is also predominantly experimental. This is true of naturally occurring vegetable protein materials such as soybeans, peanuts, linseeds, cotton seeds, sesame seeds, and sun flower seeds, the most significant ones. Extensive research has been conducted on these in efforts to develop useful food products. As a result, some of these materials are presently being processed on a relatively limited basis to produce food products commonly called edible vegetable proteins.

Even though such vegetable protein materials can be processed in a manner to render them useful as food, however, a very significant limitation on actual acceptance of such exists because of the undesirable flavor, odor and appearance of such. This is a particularly acute problem with respect to edible protein products prepared from soybeans and the bitter, beany flavor and odor, and yellowish appearance of edible soy protein. As mentioned above, a large number of treatments have been suggested for reducing such undesirable characteristics, including the addition of many reactive agents, a variety of cooking procedures, and the addition of flavor-masking reagents. Because a few of these suggestions result in a somewhat palatable food product, edible proteins are presently being prepared and sold for a limited number of applications where the residual undesirable flavor and odor will not be noticed or can be masked.

Yet, as is well known, efforts to directly substitute edible protein such as soy protein for completely bland products such as dairy products, particularly dried skim milk, have not been successful because the undesirable flavor and odor become apparent immediately. The characteristic bitter flavor is readily detected from the yellowish product, whether in dry or liquid form. Also, when heated, the product exhibits the characteristic odor. Hence, edible vegetable proteins, particularly those from soybeans, are definitely limited in utility for food products, as they are presently produced.

The inventor herein, being familiar with the currently produced edible soy protein of the assignee herein and with the palatability problem involved, decided out of curiosity to try on soy slurry a special process he was working with on another project, to see what would happen. To his surprise and that of other of the assignee's employees who had worked on the flavor and palatability problem, a very practical and inexpensive method of actually removing the residual flavor and odor was discovered using heat and pressure, yet while retaining high dispersibility and functionality. Further experimentation showed that the method was totally reliable for these purposes, and further, improved the appearance substantially to cause the product to change from yellowish to a more desirable whitish color very similar to skim milk. The product was not chalky, grainy, or gummy. In fact, the novel product even passed the very critical test of being substitutable for dried skim milk without detection. The dried product has excellent redispersibility in water. The flavor is completely bland, enabling the product to be employed directly as a food, or in a vast variety of foods in place of dairy derivative products. The novel product has excellent food value as well as good palatability. It can moreover be converted to food products of a variety of shapes and forms, with a controlled degree of dispersibility, with a controlled degree of gelatin, in liquid or solid form, with desired flavor additives.

The novel process requires no special chemical additives, or long periods of treatments. It does not destroy the character of or breakdown the soy protein. It uses elevated temperatures far above the low range temperatures at which the product heretofore would convert to a gel, yet without converting to a gel unless this is desired. Also, even though heated to high temperatures, no extended cooking is needed to subsequently breakdown a resulting gel by chemical decomposition of the structure, as was previously necessary.

This discovery is considered a major breakthrough in the edible vegetable protein field, particularly for soy protein materials, enabling such materials to now be widely adopted in the food industry to provide a completely palatable and readily acceptable food from materials that could only be used heretofore on a limited basis. Extensive experimentation with food products has proven its complete acceptability, even in products of a bland nature, products requiring heating, and many others.

The unique processing steps are preferably used after certain preliminary steps are conducted on soybean materials. Because these unique processing steps are preferably employed in combination with certain preliminary steps, and because it is desired to explain the entire process in detail, the invention will be explained herein by describing the operation from the beginning.

DESCRIPTION OF PREFERRED EMBODIMENTS

This operation will be described with respect to soybean and edible soy protein products because this was the major area of concern for which the process was discovered, and because the process is particularly suited for removing the very objectionable flavor and odor of soybean materials.

In brief outline of the total process, the soybeans forming the starting material are ground or crushed, the oil is extracted to leave soybean meal or flakes, the proteins and sugars are dissolved out of the flakes into solution, the proteins are precipitated out of the solution, washed, and put into water suspension as a slurry. The slurry is given a controlled pH range as discussed in detail hereinafter. The slurry also has a controlled range of solids content. It is then instantly dynamically heated to a controlled elevated temperature range, and subjected to dynamic physical working, preferably of a shearing type, then held at controlled elevated temperatures under positive pressure to prevent vaporization for a brief, controlled time interval. Then the pressure is suddenly released to instantly volatilize part of the moisture and cause objectionable components of unknown type to be entrained by the volatilized moisture, both of which are removed from the slurry, resulting in the removal of undesired flavor and odor characteristics with retention of high dispersibility well above 75 percent, even 85 percent or so. The slurry is then preferably but not necessarily dried to a white bland flavored powder which has high redispersibility.

More specifically, the soybeans are crushed or ground in convenient fashion, and passed through a conventional oil expeller. The oil is preferably removed by solvent extraction, using solvents normally employed for this purpose.

The resulting solids, commonly referred to as soybean meal, and normally in the form of flakes, contain many ingredients including complex proteins, sugars, fibers, and others. The proteins and sugars are then preferably dissolved out of the solids. This may be done by adding the flakes to an aqueous bath and adding a food grade alkaline material to rise the pH substantially above 7. Typical of such alkaline reagents is sodium hydroxide, potassium hydroxide, calcium hydroxide or other commonly accepted food grade alkaline reagents. The material is then cooked for a period of time sufficient to put the proteins and sugars in solution, usually about 30 minutes or so. The resulting liquor solution is separated from the solids, as by passing the material through a screen and/or centrifuging. Preferably, the liquor is then cycled through a clarifier to remove tiny particles.

The soy proteins are then precipitated from the liquor by lowering the pH to an acidic value of the isoelectric point of the protein, usually ph of 4.6–4.9, with the addition of a common food grade acidic reagent such as acetic acid, phosphoric acid, citric acid, tartaric acid, or others. The precipitate is then separated as by centrifuging, and washed with water to remove remaining sugars, except for a minute trace which is practically impossible to remove. The precipitate is then made into an aqueous slurry by adding water. The slurry as pretreated forms the most desirable product with respect to the characteristics presently sought.

This slurry can then be further processed as described in detail hereinafter. However, it is significant to note that this slurry of isolated soy protein can alternatively be dried, and then subsequently rehydrated and further processed in the same manner, as described hereinafter. Drying of the isolated soy protein is preferably by a flash dry technique such as spray drying or the equivalent, due to retention of redispersion capacity. The dried material may be stored for a period of time or immediately reslurried for further processing. It has been found that the dried-reslurried material results in a slightly different final product than the final product resulting when the isolated protein slurry is directly processed further. The technical explanation of this is not fully understood. The final product from the dried-reslurried isolated soy protein is slightly inferior for uses such as simulated dairy milk and the like.

The slurry then has its pH adjusted. This is important in order to obtain a final product with high water dispersibility. Specifically, the pH is adjusted to a range of about 5.7 to 7.5, preferably between about 6.5 and 7.1. Below about 5.7, the water dispersibility of the final product is very low and not useful for many purposes. However, such a product, when specially heated as described hereinafter, can be desirably used where low dispersibility and bitter-less flavor is useful, as for example, in baked goods, in cereals, and others. At a pH above about 7.5 and approaching 8.0, the final product tends to assume an undesirable soapy taste. The degree of dispersibility in the final product can be regulated by varying the pH within the controlled pH range of about 5.7–7.5, to suit the product to the final food being prepared. The pH may be easily adjusted by adding a food grade alkaline reagent such as sodium bicarbonate, or even by washing with water for a period of time.

The slurry to be further processed should have a controlled solids content of about 3–30 percent by weight, and preferably about 5–17 percent by weight. It if falls below about 3 percent, subsequent processing steps are not economically advisable when a continuous process is employed. Drying is particularly costly. Above about 17 percent solids content, the resulting product does not subsequently lend itself to the preferred flash drying techniques, such as spray drying using a jet or spinning thrower or such as a hammer mill type unit, so that other drying techniques must be employed, to result in a product that is not as desirable in its functional characteristics. Above about 30 percent solids content, brownish discoloration of the product tends to occur during the processing, probably due to carmelization of the minute amounts of sugars remaining in the slurry.

Each tiny portion of this slurry is then subjected to dynamic instantaneous heating to an elevated temperature range while also being dynamically physically worked, preferably almost simultaneously. Currently, the most satisfactory way of achieving this is to pass the slurry through a device commonly known as a Jet Cooker. It includes adjacent jet nozzle orifices, normally concentric, through which the slurry and the pressurized steam used as a heating agent are ejected at high velocities in intersecting flow patterns, so that each tiny bit of slurry is instantly dynamically heated by the steam while practically simultaneously being subjected to severe physical forces at the nozzle, such physical working being largely of a shearing nature. The physical working of each tiny portion is believed to expose the obnoxious substances to further action, and this physical working with the elevated temperature heat treatment is believed to weaken and/or break the tenacious bond between these obvious substances and the complex protein molecules, to an extent where these substances can be laded away by flashed off vapors, as described hereinafter. This physical working and heating also tends to eliminate some of the characteristic soy flavor, but more importantly, prepares the material for the subsequent processing steps. The temperature range to which the slurry is heated for the desired results is about 220°–400° F., although the temperature should not be in the lower region of this range unless the product is subsequently vented into a vacuum chamber after being held under pressure in a special holding chamber, as explained hereinafter. Normally the temperature should be about 285°–320° F. for best results. If higher temperatures than about 320° F. are used, the ultimate product will tend to develop a gelling nature, with the degree of gelation being generally in proportion to the increase in temperature above this range. Temperatures above about 400° F. are normally not advisable because of process problems created and lower quality of resulting product. Temperatures between about 220° F. and 285° F. result in not quite all the objectionable flavor being removed, although high dispersibility is retained.

The product is introduced to the jet cooker nozzle at a positive pressure. This pressure should be at a value near the pressure of the steam injected into the slurry, should be sufficient to cause high-velocity discharge of the slurry through the jet nozzle, and must be greater than the pressure in the special retention chamber immediately downstream of the nozzle. Normally the steam pressure is about 80–85 p.s.i.g., the slurry line pressure is slightly above the steam pressure, usually about 85–100 p.s.i.g., and the discharge pressure in the chamber downstream of the nozzle is about 75–80 p.s.i.g. The pressure drop of the slurry across the nozzle is about 5–15 p.s.i., depending upon these other pressures, with 6–10 p.s.i. being common.

The time interval of the slurry in the nozzle is estimated to be about 1 second or less. The nozzle orifice for the slurry is small, being only a fraction of an inch, e.g., about one-eighth inch, so that the slurry solids are subjected to severe dynamic, physical working during passage. The steam intermixes intimately with the solids in the ejected slurry. The amount of steam required is not great, normally being an amount to lower the solids content of the slurry about 1–2 percent by weight.

Preferably the nozzle orifices are concentric, with the slurry being ejected from the center orifice, for example, and the steam from a surrounding annular orifice oriented to cause its output flow path to intersect the output flow path of the center orifice. The slurry and steam could be ejected from the alternate orifices however. Further, the adjacent orifices need not necessarily be concentric to obtain this interaction.

As noted previously, the steam and slurry are ejected into a special retention chamber. This may comprise an elongated tube through which the intermixed slurry and steam moves from the jet nozzle on one end of the tube to a pressure controlled discharge on the other end. The discharge can be controlled by a conventional preset pressure release valve to enable continuous process flow from the nozzle to and out of the discharge valve. This valve regulates the pressure in the holding chamber. This chamber pressure must be great enough to prevent any significant vaporization of the moisture in the chamber, even though the temperature is well above the boiling point of water. A pressure of about 75–80 p.s.i.g. readily achieves this. Since slurry and steam must continuously flow into this pressurized chamber, the pressure behind the slurry and the steam must be greater than the chamber pressure to cause this continuous flow.

The heated slurry is retained in the holding chamber for a definite but relatively short time period of a few seconds up to a few minutes, normally of about 7 seconds to about 100 seconds. It is only necessary to retain the product in this heated condition for a few seconds for optimum product. The time is not too critical in this range, although the longer the slurry is held, the greater the likelihood of gelation of the product with subsequent release of pressure, particularly at higher temperatures of treatment. If a degree of gelation is desired, this is an effective manner of achieving it. In fact, by increasing the holding time, and/or increasing the slurry temperature, and/or increasing the percentage of solids in the slurry, the operator can controllably increase the gelation of the final product a desired amount.

The pressure on the slurry is then instantly released by discharging the slurry to a reduced pressure zone, into a suitable receiving means. This causes "flash off" of a portion of the moisture in the form of water vapor which is laden with the entrained odiferous, obnoxious pungent chemical components or substances of unknown composition from the soy product. The flash off also causes substantial cooling of the remaining slurry because of the heat of vaporization absorbed from the slurry, so that the total time which the product is subjected to elevated temperatures is very short and controlled. Removal of the substance-laden vapors removes the objectionable flavor and odor characteristic. This special treatment of the vegetable protein causes retention of the high dispersibility of the raw product in the final product. It usually decreases only 1 or 2 percent, e.g., from about 87 percent to about 85–86 percent for soy protein materials. This is in sharp contrast to a decrease from about 87 percent to about 20 percent or less when heat treated according to conventional teachings. Further, the product is completely sterilized by this treatment. Since prior processing involved definite difficulties at elevated temperatures, sterilization never was completely satisfactory prior to this invention. However, because of the substantially elevated temperatures here involved, and the intimate mixture of the hot steam with the slurry, sterilization is greatly improved.

The reduced pressure zone into which the slurry is discharged is normally at atmospheric pressure, but it is sometimes subatmospheric, i.e., at a partial vacuum. In either case, the vapors should be instantly conducted away from the slurry, preferably by a moving current of air across the slurry or by drawing a continuous vacuum on the discharge zone to draw the vapors away. The vapors may be specially condensed in a fashion to positively remove the condensate from the area of the collected discharged slurry. In production, the slurry may be discharged from the back pressure control discharge valve directly into a vessel in the open atmosphere where the vapors are allowed and/or caused to rise directly away from the slurry and are prevented from condensing in a manner to allow the condensed substance to flow back into the product.

To assure complete removal of the vapors from the purified slurry without allowing the vapors to recondense back into the slurry, the slurry and vapor should be separated immediately after discharge, i.e., immediately after pressure release. In this regard it is undesirable to cause passage of both components through a common conduit downstream of the discharge valve, and if such is done, it should be minimal.

As noted, the most preferred method of physically exposing and thermally and physically releasing the objectionable substances from the protein molecular bundles, for subsequent carry off, is by use of the jet cooker. It is conceivable that the intimate violent physical treatment to break up the protein bundles and expose these substances can be practiced by the use of other equipment such for example by the shearing action of high pressure pumps, followed by momentary heating in an elevated pressure zone, prior to pressure release and flash off. Moreover, the heating action of the subdivided protein bundles, or the heating plus physical working can conceivably be achieved with alternate equipment such as a hot zone flow tube or coil. Such a device causes rapid flow through a constricted tube, one zone of which is exposed to a heat source such as a gas flame. Other alternative apparatus includes apparatus operating on magento striction principles, apparatus employing radiofrequency heating and agitation, electrostatic heating apparatus, supersonic wave devices, film diaphragm vibration equipment, and reso-jet resonating flame apparatus. In fact, one or more of these devices could be combined with the jet cooker to increase the physical working action.

The resulting slurried product can then be used directly for food products. It is an attractive white product. If the pH, prior to treatment, was within the stated range, the slurry contains most of the material in a partially dissolved state and a partially dispersed colloidal state that does not tend to settle out. Alternatively, it can be dried, with the dried product having excellent redispersibility in an aqueous medium.

If the slurry is then dried, preferably the product is flash dried because of the uniform, fine, powderous product obtained, the economical continuous processing afforded thereby, and the excellent redispersion characteristics of the powder. Of the flash drying techniques, spray drying is usually used. The product may be freeze dried, but this is more costly. However, if the solids content of slurry is above about 16–17 percent, flash drying becomes difficult or impossible. Then, other drying techniques such as drum drying, tray drying, or the like must be employed, but the dried product tends to be somewhat lumpy.

The dried powder is completely bland to the taste. The bitter flavor characteristic of soy protein is gone. It is capable of rapid simple rehydration to a suspension simply by adding water and stirring, because of its high redispersion capacity. The product may be used as a substitute for dairy product derivatives, even dried skim milk, for a variety of purposes. It possesses no strong characteristic soy odor or taste, even when heated, and in spite of its high dispersibility which makes flavor so detectable.

The novel processing not only drastically improves the flavor and odor, provides functionality, and causes quality sterilization, but also causes a distinct and advantageous change in appearance. That is, prior to the processing the color is yellowish, particularly as suspended in slurry form. After processing, the product is whitish. When dried, the whitish colored product has the attractive appearance of dried skim milk.

If the product is at least partially gelled by control of operating variables in accordance with the teachings herein, only partial drying or no drying at all need be practiced.

Although the inventive concepts will be readily understood from the foregoing description, by one having ordinary skill in this art, the following illustrative examples are given to assure a complete understanding.

EXAMPLE 1

A. Soybeans are ground and the oil extracted with hexane to give flakes commonly called soybean meal. The flakes are added to an aqueous bath and a food grade alkaline reagent, sodium hydroxide, is added until a pH of 10 is reached. The material is cooked for 30 minutes, and then centrifuged. The soy protein material is precipitated from the liquor by adding acetic acid until the isoelectric point is reached at about a pH of 4.7. The precipitate is washed with water, and then added to water to make an aqueous slurry of 15 percent solids by weight.

B. The pH is then adjusted to 6.7 by adding sodium bicarbonate.

C. The slurry is then passed through a jet cooker under a pressure of 85 p.s.i.g., simultaneously with steam ejection from the jet cooker under a pressure of 95 p.s.i.g., into a pressure retention chamber at a pressure of 75 p.s.i.g. The steam heats the slurry through the jet cooker to a temperature of 290° F. After 7 seconds, progressive portions of the heated slurry are suddenly discharged into a receiver at atmospheric pressure or below, causing flash off of vapors laden with obnoxious smelling and tasting substances. The slurry is cooled by the flash off vaporization. The substance laden vapors are removed from the purified slurry.

D. The slurry is flash dried in a spray drier to a moisture content of 3 percent.

EXAMPLE 2

The steps A and B in Example 1 are followed, but in step C, the slurry is heated to 260° F., held in the retention chamber for 15 seconds, and ejected into a vacuum chamber at a pressure of p.s.i.

EXAMPLE 3

The step A in Example 1, followed by adjusting the pH in step B to 5.7. In step C, the slurry, when passed through the jet cooker, is heated to a temperature of 340° F., retained for 30 seconds under pressure before discharging. When discharged and vapor flashed, the product is partially gelled.

EXAMPLE 4

Crushed full-fat soybeans, without hulls, are put into water to make an aqueous slurry of a 20 percent solids content. The slurry is passed through a jet cooker under a pressure of 75 p.s.i.g., with steam, and heated to 310° F. The slurry is held under a pressure of 70 p.s.i.g. for 50 seconds and then discharged to atmospheric pressure. The resulting slurry is drum dried, and used as animal feed.

EXAMPLE 5

The steps A and B of Example 1 are performed except that the pH in step B is 7.1. Then the slurry is passed through a high pressure pump and put under pressure of several hundred p.s.i., then passed through a hot zone flow tube and rapidly heated to a temperature of 250° F., held under pressure for 12 seconds, and discharged to a vacuum chamber where the substance-laden vapors are removed. The product is then freeze dried.

Hundreds of other examples could be given but would only unduly lengthen this description.

The functional characteristics of the novel product includes capacity to serve well as a water and fat binder in the slurry for homogenous dispersion thereof rather than separation. This facilitates its utility in many products as a direct substitute for dairy products. It further has excellent utility as a low calorie, high protein food. The protein content can be varied greatly depending upon whether other components such as sugars, fiber etc., are initially removed, by adding controlled amounts of isolated soy protein (about 90 percent or greater protein) to the slurry prior to the physical and thermal processing steps, or the like.

Since the product can be used in a liquid slurry form with an edible liquid carrier such as water which dissolves a share of the protein and holds the remainder in a finely divided suspension, it is useful for high protein beverages of various types, as liquid protein additives to food products, or as a thickener. The product can also be used in powder or flake form as a cereal, as an additive to increase food protein content of such foods as spaghetti and macaroni, as a thickener for foods, and as a protein supplement as for meat or imitation meats. It could be employed as the basic ingredient of puddings, as additives to bakery products such as cakes, cookies, and bread. Even when employed in products which are baked, broiled, fried, cooked, or otherwise heated, no objectionable odor arises with the presence of the soy product, thereby removing a substantial objection to its use by various segments of the food industry. The novel product in a powder form can be converted to a paste which forms a high protein food spread of selected flavors.

It also can be in the form of a semigelled or totally gelled product useful in high protein, low calorie desserts, thickeners, candies, or imitation fruits of various types.

Additional food items formable by the product per se or as an additive include coffee whiteners, spun protein fiber, in ice cream or as simulated ice cream, candy, pie crusts, crackers, chocolate, in butter and oleomargarine, snack dips, snack chips, sauces e.g., white, cheese, and hollandaise, as meat extenders as in sausage, in pie fillings, in frozen desserts, whip toppings, and marshmallows. Present experimentation is resulting in many other unique applications of the novel vegetable protein, nondairy, negligible calorie, food products. The novel product can also be added to dairy products in various special ways to achieve totally new food products.

In view of the basic significance of this invention, and the breakthrough it creates in vegetable protein food technology, it is considered that the invention is not to be specifically limited to the disclosure details, but is to be defined by the scope of the appended claims and all reasonable equivalents.

I claim:

1. A process of continuously treating isolated soy protein comprising the steps of: forming a slurry of isolated soy protein having a pH of about 5.7 to about 7.5 and a solids content within the range of 5–17 percent; practically instantly heating successive portions of the slurry to a temperature of about 220°–400° F., on a continuous basis while physically working it under dynamic flow conditions, subsequently retaining the slurry in the heated condition under positive pressure for at least a few seconds and up to a few minutes to cause changes in the soy protein that improves the flavor thereof; and then suddenly releasing the pressure on successively advanced portions thereof, such sudden pressure release causing flash off volatilization and removal of water vapor therefrom laden with noxious components that possess undesired flavor and odor characteristics, and separating the vapors from the slurry to thereby result in a bland flavored soy protein product.

2. The process in claim 1 wherein said temperature is about 285°–320° F. and said retaining step includes holding the slurry under pressure for about 7 seconds to about 100 seconds prior to pressure release.

3. A process of treating isolated soy protein to obtain a bland flavored food product comprising the steps of: preparing an aqueous slurry of the isolated soy protein having a pH of less than 8 and a solids content within the range of 3–30 percent; heating the slurry rapidly and dynamically to elevated temperatures above about 220° F., and momentarily subjecting it to dynamic physical working; retaining the slurry for a brief period of time under a positive pressure sufficiently high to prevent volatilization of heated water vapor from the heated slurry; suddenly releasing the pressure to cause flash off volatilization of vapor laden with substances that possess undesired flavor and odor characteristics, and separating the vapors from the slurry to thereby leave a bland flavored isolated soy protein product.

4. The process according to claim 3 wherein said heating is to a temperature of about 220°–400° F. and is achieved by injecting steam into said slurry under pressure on a continuous flow basis, as said slurry is ejected under pressure at a high velocity from a restricted passage.

5. The process according to claim 3 wherein said temperature is about 285°–320° F. and said retaining step includes holding the slurry under pressure for about 7 seconds to about 100 seconds prior to pressure release.

6. The process according to claim 3 wherein said aqueous slurry has a solids content of 5–17 percent by weight and wherein the bland flavored isolated soy protein product is dried 7. The process according to claim 3 wherein the temperature of the slurry is practically instantly heated to a temperature of about 285°–320° F. in a fraction of a second, and held at that temperature for several seconds before pressure release, and then is instantly lowered to below 212° F. with said pressure release.

8. The process according to claim 3 wherein the pH of the aqueous slurry is within the range of about 5.7 to about 7.5.

9. The process according to claim 8 wherein the slurry has a solids content of 5—17 percent and said heating is to a temperature of about 220°–400° F. and is achieved by injecting steam into said slurry under pressure on a continuous flow basis as said slurry is ejected under pressure at a high velocity from a restricted passage.

10. The process according to claim 8 wherein said heating step includes heating the slurry to a temperature of about 220°–400° F. and said retaining step includes holding the slurry under pressure for about 7 seconds to about 100 seconds prior to pressure release.

11. The process according to claim 10 wherein said temperature is about 285°–320° F.

12. The process according to claim 8 wherein said pH range is 6.5 –7.1.

13. The process according to claim 8 wherein the pressure on said heated slurry is released into a subatmospheric enclosure on which a negative pressure is drawn for optimum volatilization and for withdrawing the volatilized water vapor with entrained noxious components.

14. The process according to claim 8 including the steps of flash-drying the slurry to form an isolated soy protein powder and forming a fresh aqueous slurry from the powder prior to adjusting the pH of said fresh aqueous slurry to a range between about 5.7 and 7.5.

* * * * *